United States Patent [19]

Koch et al.

[11] Patent Number: 4,817,208

[45] Date of Patent: Mar. 28, 1989

[54] FIBER OPTIC RECEIVER

[75] Inventors: Karl C. Koch; Carlo F. Petronio, both of Pittsburgh; Charles W. Einolf, Jr., Murrysville, all of Pa.

[73] Assignee: Westinghouse Electric Corp., Pittsburgh, Pa.

[21] Appl. No.: 94,185

[22] Filed: Sep. 8, 1987

[51] Int. Cl.$^4$ ............................................. H04B 9/00
[52] U.S. Cl. ..................................... 455/619; 330/59
[58] Field of Search ............... 455/606, 607, 617, 619, 455/600, 608; 330/59, 308

[56] References Cited

U.S. PATENT DOCUMENTS

| 4,428,017 | 1/1984 | Vaerewyck et al. | 455/602 |
| 4,677,982 | 7/1987 | Llinas et al. | 455/607 |

FOREIGN PATENT DOCUMENTS

| 2164515 | 3/1986 | United Kingdom | 455/617 |
| 2176962 | 1/1987 | United Kingdom | 455/619 |
| 8505746 | 12/1985 | World Int. Prop. O. | |

Primary Examiner—Robert L. Griffin
Assistant Examiner—L. Van Beek
Attorney, Agent, or Firm—B. R. Studebaker

[57] ABSTRACT

An optical receiver especially useful for digital fiber optic systems operating a high pulse rates, converts the pulsed current signal generated by a PIN diode into a pulsed voltage utilizing a current to voltage converter comprising an FET input transistor, a complimentary cascoded bipolar transistor, and a large feedback resistor to reduce noise while providing a wide band width and dynamic range. The pulsed voltage signal is amplitude limited in a limiting amplifier and passed through a low pass filter to remove excess bandwidth and further reduced noise before being applied to a high speed comparator which generates the digital output. The pulsed voltage signal is passed from the current to voltage converter to the limiting amplifier through an emitter follower coupling transistor to isolate the open loop gain of the current to voltage converter so that its band width will not be changed with load.

15 Claims, 1 Drawing Sheet

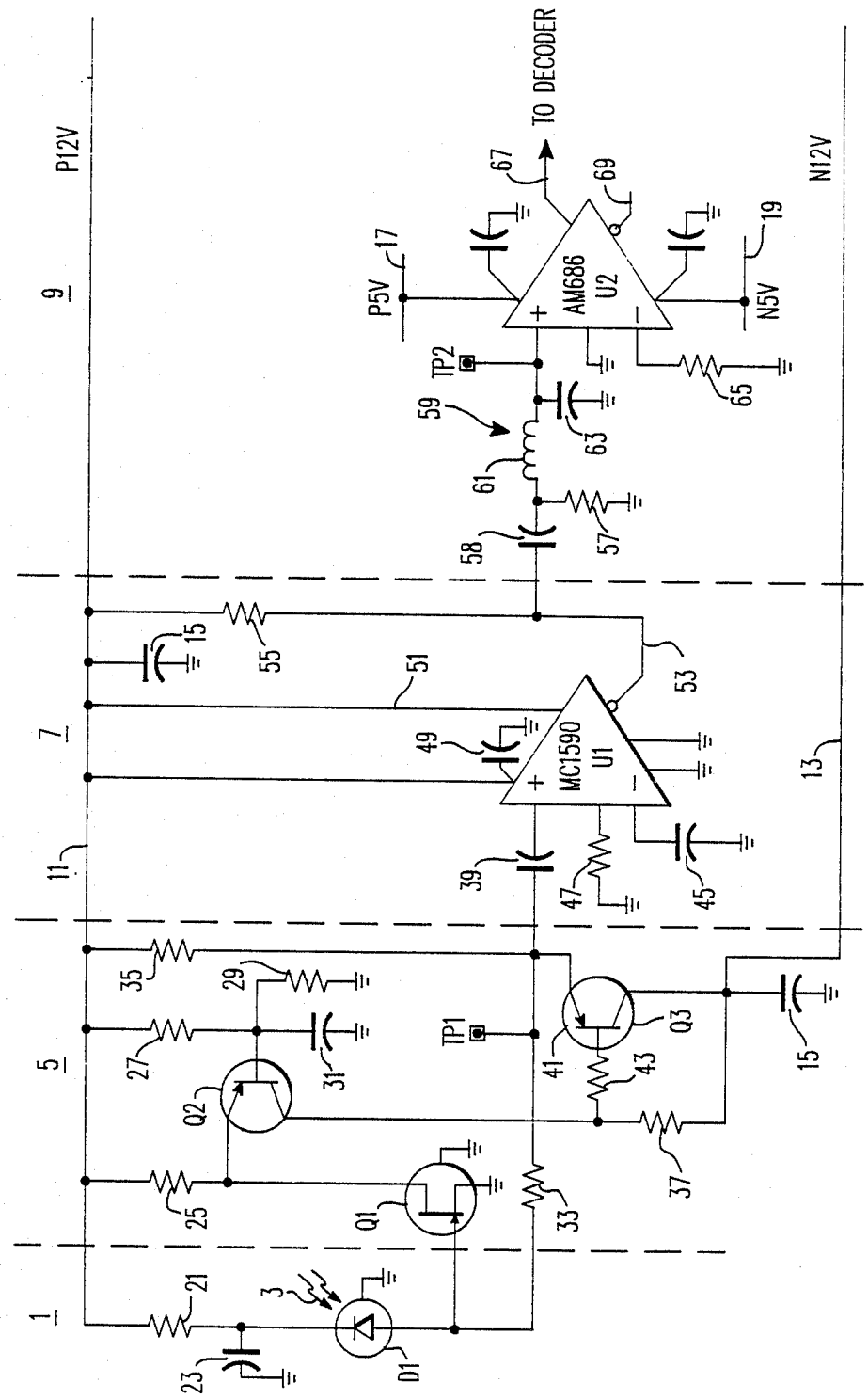

FIBER OPTIC RECEIVER

BACKGROUND OF THE INVENTION

1. Field of the Invention

This invention relates to an optical receiver specifically designed for a fiber optic system. More particularly, it is especially suitable for a digital fiber optic system operating at high pulse rates, such as for example time multiplexed communications systems.

2. Background Information

A common photodetector used in fiber optic systems to convert light signals to electrical signals is the PIN diode because of its sensitivity, linearity, and relatively low cost. Two types of circuits are generally used with PIN diodes to produce the pulsed electrical output in digital fiber optic systems; the equalization type receiver and the transimpedance type receiver. In any such system it is desirable to have a wide dynamic range and wide bandwidth, but with low noise.

In the equalization type receiver, the current signal generated by the PIN diode is converted to a voltage signal by applying the output of the diode to a resistor. For a wide bandwidth the value of the resistor must be low, however, this increases the noise content of the voltage signal. To improve the signal to noise ratio, the equalization type receiver circuit uses a large resistor to convert the current signal to a voltage signal, however, this reduces the bandwidth. An equalizer stage later restores the bandwidth.

In the transimpedance type receiver circuit, a high gain amplifier with an impedance connected between the amplifier input and output terminals is used to convert the current signal generated by the PIN diode into a voltage signal. This arrangement allows a wide bandwidth for a large value of feedback resistance which reduces the noise content of the voltage signal, but has such a large dynamic range that the signals of lower magnitude are insufficient to operate a comparator provided in the output circuit to restore the shape of the received pulses. Accordingly, an automatic gain control is often inserted between the voltage to current converter and the comparator in the output stage. However, such an automatic gain control is complex and may be too slow for rapid changes in signal level.

In order to obtain wide bandwidth with a large feedback resistor in the transimpedance amplifier, the amplifier input capacitance must be as low as possible. It is known to utilize low capacitance devices connected in a cascode configuration to avoid the increase in input capacitance due to the Miller effect. However, to our knowledge such cascoded transistor stages have not been used in current to voltage converters for transimpedance type optical receivers. In any event, cascoded transistor devices to date have been, to our knowledge, of the same type: that is both FETs or both bipolar transistors, and have either both been PNP devices or both NPN (both N-channel or both P-channel devices for FETs).

In view of all of the above, there remains a need for an inexpensive fiber optic receiver which has the required sensitivity, bandwidth and low noise level for receiving data at high pulse rates such as the 1.544 mega bits per second pulse rate of T1 communications systems.

Accordingly it is the primary objection of the invention to provide a broad band, wide dynamic range, low noise optical receiver for pulsed light signals which is inexpensive.

SUMMARY OF THE INVENTION

This and other objects are realized by the invention which is directed to a broad band, wide dynamic range, low noise optical receiver for pulsed light signals which includes a photodetector, preferably a PIN diode, for converting the pulsed light signal to a pulsed electrical current signal. A transimpedance type current to voltage converter converts the electrical current signal generated by the PIN diode into a pulsed voltage signal. Preferably, this converter comprises cascoded complimentary transistor devices, and in particular an FET input stage and a bipolar transistor output stage. A broad band limiting amplifier amplifies the pulsed voltage signal generated by the current to voltage converter, while limiting its peak to peak value to a value which avoids overdriving the next stage and preserves its broad bandwidth, to generate an amplitude limited pulsed voltage signal. The amplitude limited pulsed voltage signal is compared in a comparator to a reference voltage to generate a shaped pulse output signal representative of the pulsed light signal received by the photodetector.

Preferably the amplitude limited pulsed voltage signal is applied to the comparator through a low pass filter to eliminate excess bandwidth and thereby further reduce noise. More particularly, it is recommended that the low pass filter have a bandwidth which is equal to about 65 to 85%, and preferably about 75%, of the reciprocal of the pulse width.

It is also preferred to couple the current to voltage converter to the limiting amplifier through an emitter follower transistor to isolate the open loop gain of the current to voltage converter so that its bandwidth does not change with load.

BRIEF DESCRIPTION OF THE DRAWING

A full understanding of the invention can be gained from the following description of the preferred embodiment when read in conjunction with the accompanying drawing which is a schematic circuit diagram of an optical receiver in accordance with the invention.

DESCRIPTION OF THE PREFERRED EMBODIMENTS

The drawing shows the novel optical receiver of the invention. This novel receiver includes a light to current converter stage 1 which converts light 3, such as a pulsed light signal received over a fiber optic system, into an electrical current signal. The pulsed electrical current signal is converted to a pulsed voltage signal in a current to voltage converter 5. As discussed below, this current to voltage converter 5 is designed to provide a wide bandwidth and wide dynamic range with low noise. The pulsed voltage signal is amplified and limited in peak to peak value in a limiting amplifier stage 7. The amplitude limited pulsed voltage signal is passed to an output stage 9 which generates a pulsed electrical signal having the wave form of the received light signal.

The receiver is powered by a positive 12 volts DC supplied on bus 11 and a negative 12 volts DC supplied on bus 13. Decoupling capacitors 15 bypass surges and noise on the power supplies to ground. In addition, positive 5 volt and negative 5 volt DC sources are provided for the output stage 9 on buses 17 and 19 respectively.

The light to current converter stage 1 comprises a photodetector D1 which is preferably a PIN diode, such as for example, a Honeywell 3478. This PIN diode D1 is reverse biased to reduce its capacitance and to provide faster operation. A low pass filter composed of resistor 21 and capacitor 23 further reduces noise from the power supply in the current delivered by the diode D1.

The current to voltage converter 5 comprises a high gain amplifier stage which includes a pair of cascoded transistor devices Q1 and Q2. The transistor devices Q1 and Q2 may both be FETs or bipolar transistors, or preferably, as in the exemplary system, one may be a FET and the other a bipolar transistor. The transistor device Q1 is connected in the mode providing both voltage and current gain, and device Q2 is connected in the mode providing voltage gain and unity current gain. Preferably Q1 is an FET connected in the common source mode to provide a high input impedance and permit low noise operation and high loop gain. Q2 is preferably a bipolar transistor connected in the common base mode to provide wide bandwidth and moderate gain.

Regardless of the type of transistor devices used for Q1 and Q2, these devices should be complimentary. That is, with N-channel FET used in the exemplary embodiment, Q2 should be PNP transistor. If two bipolar transistors are used, one should be a PNP type and the other an NPN. If two FETs are used, one should be an N-channel device and the other a P-channel device. Using complimentary type transistor devices in a cascode arrangement in the current to voltage converter simplifies biasing and accomodates a DC coupled circuit by eliminating the need for a coupling capacitor in the feedback loop. Suitable devices for the exemplary circuit are an N-channel FET such as the 2N4416 for Q1 and a PNP transistor such as the 2N3251 for Q2.

A resistor 25 provides biasing currents for Q1 and Q2. A pair of resistors 27 and 29 set the DC base voltage for Q2, and a capacitor 31 puts the base of Q2 at signal ground. The feedback resistor 33 in the current to voltage converter 5 by virtue of its large value reduces noise in the pulsed voltage signal generated by this stage.

The pulsed voltage signal generated by the current to voltage converter 5 is generated across the resistor 37. This pulsed voltage signal is applied to the limiting amplifier stage 7 through a DC blocking capacitor 39 and an emitter follower, PNP transistor Q3, such as for example a 2N3251. Q3 provides a low impedance drive for the limiting amplifier and isolates the open loop gain of the current to voltage stage 5 so that its bandwidth does not change with load. A resistor 43 connected to the base of Q3 forms with internal capacitance of Q3 a low pass filter which reduces the tendency of the circuit to oscillate.

The output of the current to voltage converter is amplified by a wide band limiting amplifier integrated circuit U1, which in the exemplary receiver is an MC1590 integrated circuit. This amplifier limits at an input voltage of approximately 60 mV peak-to-peak. The pulsed voltage signal is applied to the non-inverting input of the amplifier U1 through DC blocking capacitor 39. Since the differential input is DC biased internally, the unused input is signal grounded through capacitor 45. The automatic gain control capability of the MC1590 integrated circuit is unused and the gain is set to maximum gain by resistor 47. Additional decoupling of noise in the power supply is achieved by a capacitor 49.

One differential output of the amplifier Q1 is connected directly to the positive 12 volt bus 11 through a lead 51. The other differential output is connected to the output stage by the lead 53. The gain of the limiting amplifier is set by the resistors 55 and 57 connected between the lead 53 and the postive 12 volt bus 11 and ground respectively. The amplitude limited pulsed voltage signal is applied through DC blocking capacitor 58 to a low pass filter 59. The low pass filter 59 is a two pole Thomson filter which includes resistors 55 and 57, an inductor 61, and capacitor 63. This low pass filter removes excess bandwidth from the amplitude limited pulsed voltage signal to reduce noise and has approximately constant group delay to minimize pulse overshoot and ringing. Preferably, the components of the low pass filter are selected such that its bandwidth is equal to approximately 65 to 85%, and more particularly about 75%, of the reciprocal of the pulse width. For instance, for a 50 nanosecond pulse the bandwidth of this filter would be about 15 megahertz.

The filtered pulse signal is applied to the non-inverting side of the differential input of a high speed comparator U2 such as AM686 integrated circuit. The inverting input of this integrated circuit is connected to ground through resistor 65 so that the comparator switches at mid-height of the bipolar pulses produced by passing this signal through the DC blocking capacitor 58. The comparator U2 generates shaped pulses on differential output leads 67 and 69 for transmission to a decoder which extracts information from the transmitted light signal. Decoupling capacitors 71 and 73 respectively remove noise from the positive and negative 5 volt source voltages applied to the comparator U2.

The exemplary receiver is specifically designed for a fiber optic system operating at the T1 rate of 1.544 megabits per second. The receiver is unique in its sensitivity and its ability to operate over a wide dynamic range. This range allows the receiver to operate over a wide range of distances in protective relaying communications applications.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A broad band, wide dynamic range, low noise optical receiver for pulsed light signals comprising:
   a photodetector converting said pulsed light signal to a pulsed electric current signal;
   a high gain current to voltage converter with a high input impedance and low output impedance converting the pulsed electrical current signal generated by the photodetector to a pulsed voltage signal;
   a broad band limiting amplifier amplifying said pulsed voltage signal while limiting its peak to peak value to a specified value to generate an amplitude limited pulsed voltage signal; and
   a comparator comparing the amplitude limited pulsed voltage signal to a reference voltage and generating a shaped pulse output signal representative of the pulsed light signal received by the photodetector.

2. The optical receiver of claim 1 wherein the photodetector is a PIN diode.

3. The optical receiver of claim 2 including a low pass filter through which the amplitude limited voltage generated by the limiting amplifier is applied to the comparator.

4. The optical receiver of claim 3 wherein the low pass filter comprises filter means having a bandwidth equal to about 65 to 85% of the reciprocal of the pulse width of the amplitude limited pulsed voltage signal.

5. The optical receiver of claim 4 wherein the low pass filter comprises filter means having a bandwidth equal to about 75% of the reciprocal of the pulse width of the amplitude limited pulsed voltage signal.

6. The optical receiver of claim 2 wherein the current to voltage converter includes complimentary cascoded transistor devices.

7. The optical receiver of claim 6 wherein one of said complimentary cascoded transistor devices is an FET and the other is a bipolar transistor.

8. The optical receiver of claim 7 wherein the complimentary cascoded transistors in the current to voltage converter comprise an FET as an input transistor and a bipolar transistor as an output transistor device.

9. The optical receiver of claim 6 wherein the complimentary cascoded transistor devices include an FET as the input device and a complimentary bipolar transistor as the output device.

10. The optical receiver of claim 6 including an emitter follower transistor coupling the current to voltage converter to the limiting amplifier.

11. A broad band, wide dynamic range, low noise optical receiver for pulsed light signals comprising:
   a PIN diode converting said pulsed light signal into a pulsed electrical current signal;
   a current to voltage converter including an FET having its gate electrode connected to receive the pulsed electrical current signal generated by the PIN diode and a bipolar transistor complimentary to the FET and cascoded therewith for generating a pulsed voltage signal;
   a broad band limiting amplifier amplifying said pulsed voltage signal while limiting its peak to peak value to a specified value generating an amplitude limited pulsed voltage signal; and
   a comparator comparing the amplitude limited pulsed voltage signal to a reference voltage and generating a shaped pulse output signal representative of the pulsed light signal received by the PIN diode.

12. The optical receiver of claim 11 including a low pass filter connected to the limiting amplifier and the comparator filtering the amplitude limited pulsed voltage signal applied to the comparator.

13. The optical receiver of claim 11 wherein said low pass filter comprises a two pole Thomson filter having a band width equal to about 65 to 85% of the reciprocal of the pulse width of the amplitude limited pulsed voltage signal.

14. The optical receiver of claim 13 wherein said low pass filter comprises a two pole Thomson filter having a band width equal to about 75% of the reciprocal of the pulse width of the amplitude limited pulsed voltage signal.

15. The optical receiver of claim 11 including an emitter follower transistor coupling the current to voltage converter to the limiting amplifier.

* * * * *